H. M. WILSON.
GUTTER'S KNIFE.
APPLICATION FILED AUG. 6, 1918.
1,299,084.
Patented Apr. 1, 1919.
2 SHEETS—SHEET 2.
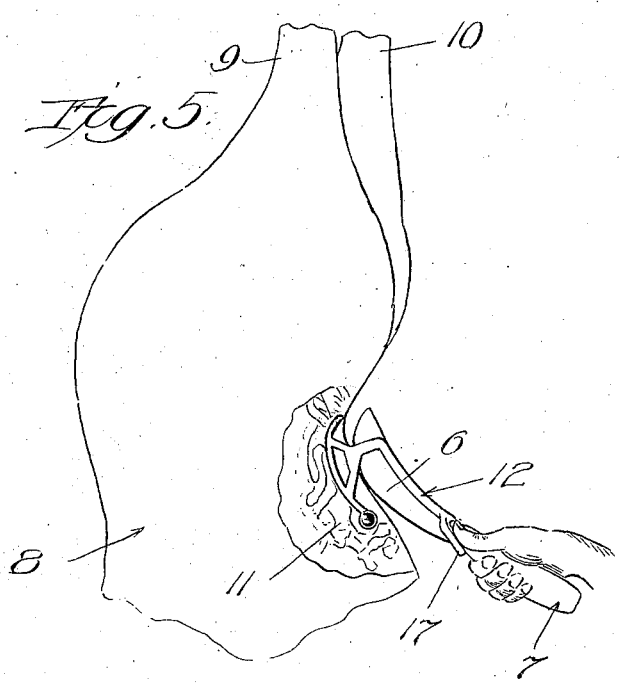
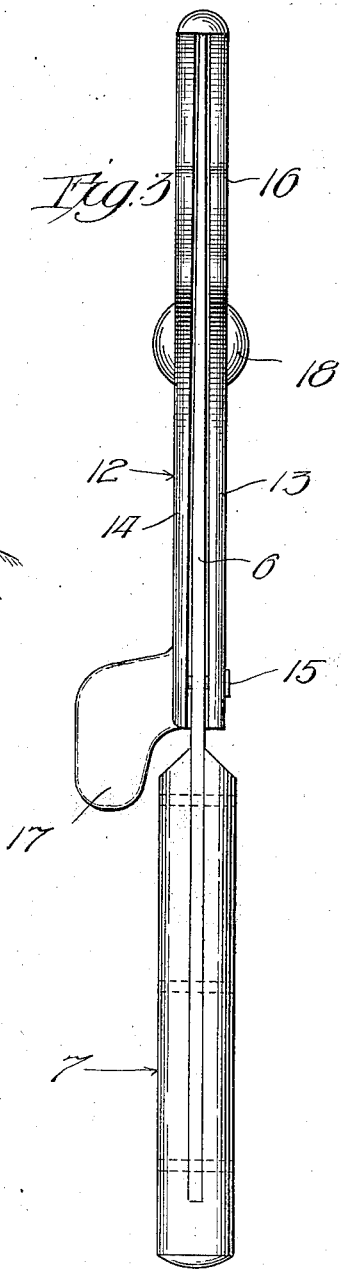
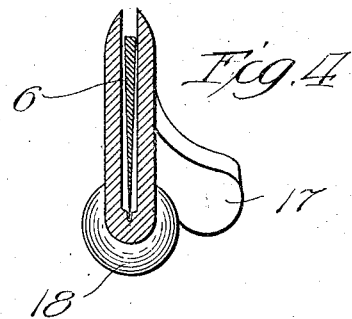
WITNESSES:
INVENTOR
Howard M. Wilson
BY
ATTORNEYS

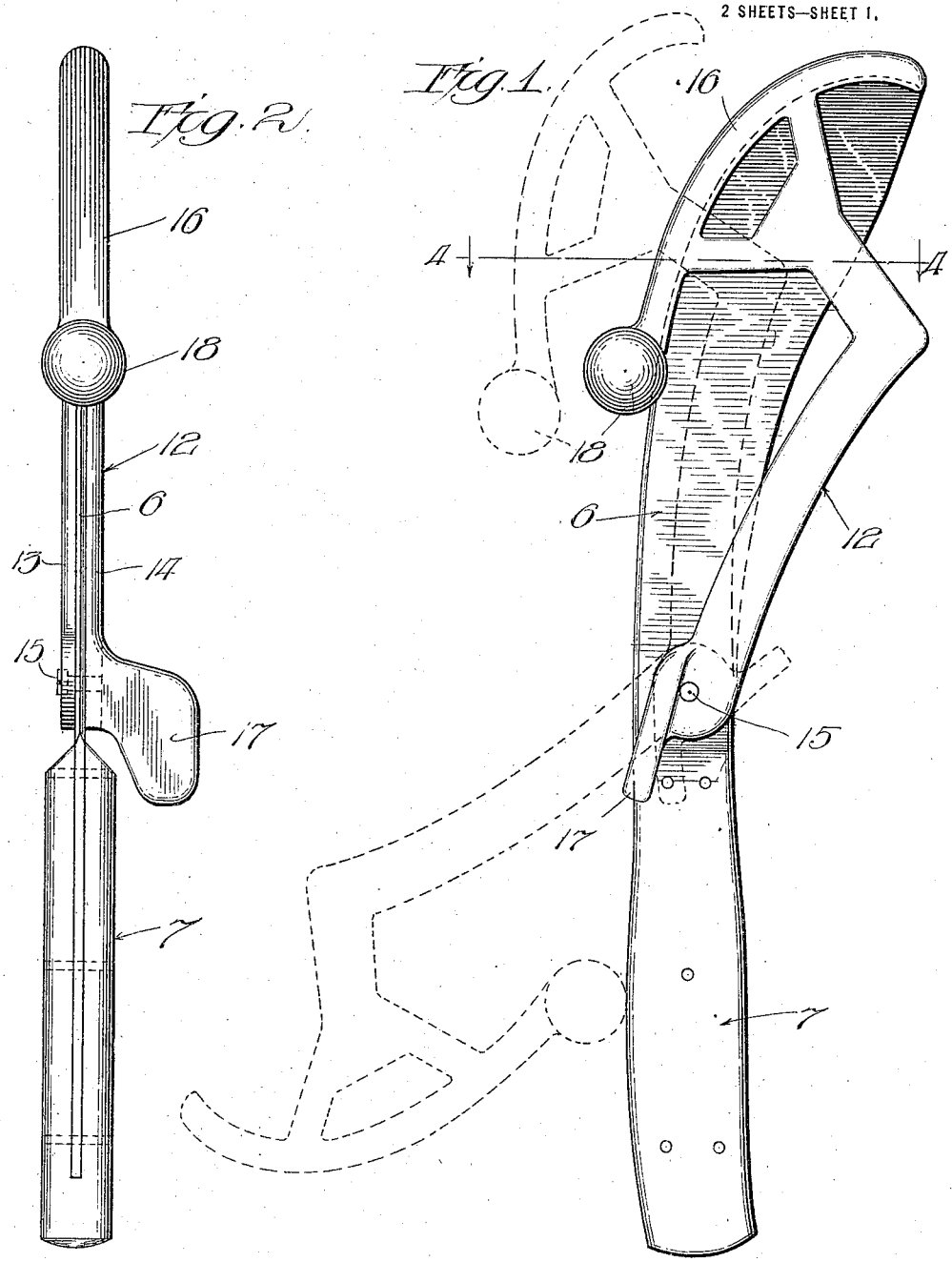

UNITED STATES PATENT OFFICE.

HOWARD M. WILSON, OF SOUTH ST. PAUL, MINNESOTA, ASSIGNOR TO SWIFT AND COMPANY, OF CHICAGO, ILLINOIS, A CORPORATION OF ILLINOIS.

GUTTER'S KNIFE.

1,299,084.  Specification of Letters Patent.  Patented Apr. 1, 1919.

Application filed August 6, 1918. Serial No. 248,567.

*To all whom it may concern:*

Be it known that I, HOWARD M. WILSON, a citizen of the United States, residing at South St. Paul, in the county of Dakota and State of Minnesota, have invented certain new and useful Improvements in Gutters' Knives, of which the following is a specification.

The present invention has to do with improvements in what are known as gutters' knives. These knives are used particularly in the so-called gutting operation in connection with certain meat preserving and packing operations. The gutter's knife is used in the operation of slitting or opening the bowels of hogs and other animals, for the purpose of removing their entrails and preparing them for further operations.

In order that certain of the features of the invention may be more clearly understood and their significance be better appreciated, I will first explain briefly the customary operations in connection with which the knife of the present invention is well adapted for use. After the hog or other animal has been killed, the belly portion must be opened. For this purpose the carcass is conveniently suspended by its hind legs, and the operator, standing in front of the belly, slits the same down the middle by the use of a sharp knife. This operation conveniently begins at the crotch and terminates near the ribs. Care must be exercised in performing this operation, as otherwise the knife will cut into and open or even sever the intestines and other parts, thereby liberating the contents thereof, and also destroying or mutilating the parts so cut or severed. The liberation of the contents is in itself undesirable because of its tendency to injure the quality of the meat and other desirable products; besides which the value of the intestines themselves for other purposes is reduced. When it is realized that the intestines are used in certain other important meat packing and preserving operations, such as in the manufacture of link sausage, it will be appreciated that the destruction or injury of even a small percentage of the intestines, will amount to many thousands of dollars in value during the course of a year.

The foregoing considerations have in the past made it necessary to use highly skilled labor in connection with these operations, and even such highly skilled labor can not attain its maximum production because of the care which it must exercise in performing the opening operations.

The main object of the present invention is to provide a knife or other instrument for performing these operations which shall in itself be so constructed that the possibility of injury to or destruction of the intestines will be minimized, while, at the same time, making it possible to conduct or perform the gutting operations without particular care or thought on the part of the operator as to the intestines themselves. The provision of such an instrument or article as the foregoing will serve not only to greatly reduce the percentage of loss, but will also largely increase the daily capacity of the operator.

Another object in this connection is to provide an attachment or device which can be very conveniently and easily attached or added to knives of a familiar and well known construction so as to give such present tools the added advantages and benefits resulting from the use of such attachment.

Other objects and uses of the invention will appear from a description of the same which consists in the features of construction and combinations of parts hereinafter described and claimed.

Referring to the drawings:

Figure 1 shows a side view of a knife or similar article having applied thereto a protecting device embodying the features of the present invention. Said protecting device is shown by full lines in the position which it occupies close up to the blade of the knife. It is also shown by one set of dotted lines in substantially the position it occupies during the gutting operation, and by another set of dotted lines in the fully opened or disengaged position;

Fig. 2 shows a front edge view corresponding to Fig. 1;

Fig. 3 shows a back edge view corresponding to Figs. 1 and 2;

Fig. 4 shows a section taken on line 4—4 of Fig. 1, looking in the direction of the arrows; and Fig. 5 shows a perspective view of a portion of a carcass suspended in working position, and shows the manner of application of the knife or implement thereto.

The features of the present invention may be used or incorporated within instruments or implements specially constructed therefor, or the said device may be added to or incorporated into implements already in existence. By way of illustration, I have shown the said device as applied to a knife having a blade 6 and a handle 7. Said blade is conveniently of generally curved shape and resembles in certain respects the ordinary butcher's knife of small size.

Referring to Fig. 5, the carcass 8 is therein shown as suspended by the legs 9 and 10. The crotch portion of the carcass is shown as being cut away, so as to expose the entrails 11 and to better illustrate the mode of application of the knife of the present invention. The knife is used by application to the crotch portion where an incision is made, and then the blade is drawn down in the manner which will be clearly understood from Fig. 5. In doing this, it has in the past been found difficult to avoid cutting into and even severing the entrails, and at any rate it has been necessary to use great care and caution in performing the operation.

I have, therefore, provided a guard designated in its entirety by the numeral 12. The said guard is bifurcated, its bifurcations 13 and 14 lying on opposite sides of the blade and being pivoted thereto at the point 15 in any convenient manner. Such pivoting is effected, for example, by the use of a screw extending through the bifurcations and blade. The swinging end of the guard is provided with a curved closed portion 16 of contour generally similar to that of the tip portion of the blade, so that when the guard is thrown back into the full line position of Fig. 1, said portion 16 will protect and cover over the tip portion of the blade. An enlargement or finger portion 17 is formed on the pivoted end of one of the bifurcations in position for convenient manipulation by the thumb of the hand of the operator grasping the handle 7, so that by pressing on said finger piece the guard can be thrown back into the full line position of Fig. 1. An enlargement 18 is preferably formed on the lower portion 16 so as to present a round or curved end at this portion of the guard.

In order that the invention may be more clearly understood and the significance of its operation appreciated, I will briefly explain the manner in which it is used. After first throwing the guard down into the lowermost position as shown by the lower dotted lines in Fig. 1, an incision may be made by the exposed blade at the point near the crotch of the carcass. After removing the knife, the guard will be thrown back into substantially the lower dotted line position of Fig. 1, and then the portion 18 will be hooked over the lower edge of the incision so made. The weight of the guard will tend to cause it to fall inwardly against the entrails, pushing them back away from the surface of the abdominal cavity. If it be found that the guard tends to fall too far inwardly, a slight pressure of the thumb against the finger piece 17 will raise the guard the desired amount, so that by slitting downward with the instrument, the surface of the abdominal cavity may be cut or split. During this operation the guard will press the entrails back out of the way at all points as the operation proceeds, so that the danger of cutting them will be eliminated, and also tends to simplify the operation, make it possible to expedite the work, and make it possible to use relatively unskilled labor.

While I have herein shown and described only a single embodiment of the features of my present invention, and only a single method of using the same, still it will be understood that I do not limit myself to the said embodiment or to the said method of use, except as I may do so in the claims.

I claim:

1. As a new article of manufacture, a knife for the purpose specified, comprising in combination a handle, a curved blade connected thereto and having its cutting edge on the convex side thereof, and a guard for said blade, said guard comprising a bifurcated member having a connecting piece of curvature generally similar to the end portion of the cutting edge of the blade, and a pair of bifurcated arms in conjunction with said connecting portion and lying at the sides of the blade, a pivotal connection between the inner ends of said arms and that portion of the blade adjacent to the handle, a finger piece on the inner end of one of the arms in position for manipulation by the thumb of the hand grasping the handle, and an enlargement on the inner end of the connecting portion, all for the purpose specified.

2. As a new article of manufacture, a knife for the purpose specified, comprising in combination a handle, a blade connected thereto, and a guard in conjunction with said blade, said guard comprising a connecting member adapted to lie in front of the end portion of the connecting edge of the blade, a pair of bifurcated arms connected to said member and lying at opposite sides of the blade, and a pivotal connection between the inner ends of said arms and that portion of the blade adjacent to the handle, all for the purpose specified.

3. As a new article of manufacture, a knife for the purpose specified, comprising in combination a blade and a guard therefor, said guard comprising a connecting member adapted to lie in front of the end portion of the cutting edge of the blade, a pair of bifurcated arms connected to said member and lying on opposite sides of the blade, and a pivotal connection between the inner ends of said arms and the other end portion of the blade, all for the purpose specified.

4. As a new article of manufacture, a knife for the purpose specified, comprising in combination a blade, a member adapted to lie in front of the end portion of the cutting edge of the blade, a pair of L-shaped arms connected to said member and lying on opposite sides of the blade, and a pivotal connection between the inner ends of said arms and the inner end portion of the blade, the concave angles of said arms facing in the same direction as the blade, all for the purpose specified.

5. As a new article of manufacture, a knife for the purpose specified, comprising in combination a blade and a guard for the end portion of the cutting edge thereof, said guard comprising a member adapted to overlie the end portion of the cutting edge of the blade, an L-shaped arm having one end connected to the member and its other end pivoted to the opposite end portion of the blade, the concave angle of the arm facing in the same direction as the cutting edge of the blade, all for the purpose specified.

6. As a new article of manufacture, a knife for the purpose specified, comprising in combination a blade and a guard for the end portion of the cutting edge thereof, said guard including a member adapted to overlie the end portion of the cutting edge of the blade, and an arm connected at one end to the member and having its other end pivoted to the blade, all for the purpose specified.

7. As a new article of manufacture, a guard for a knife, said guard comprising a connecting member of contour similar to the cutting edge portion of a blade to which it is to be applied, and a pair of separated arms connected at one end to said connecting member, and having their other ends adapted for pivotal connection to a blade lying between them.

8. As a new article of manufacture, a guard for the cutting edge portion of a knife, comprising a member adapted to overlie a portion of the cutting edge of a blade to which it is to be applied, and an arm connected at one end to said member and having its other end adapted for pivotal attachment to the blade aforesaid, substantially as described.

HOWARD M. WILSON.

Copies of this patent may be obtained for five cents each, by addressing the "Commissioner of Patents, Washington, D. C."